(12) United States Patent
Dewitz et al.

(10) Patent No.: US 7,648,544 B2
(45) Date of Patent: Jan. 19, 2010

(54) SWIRL TUBE SEPARATOR

(75) Inventors: Thomas Shawn Dewitz, Bellaire, TX (US); Hubertus Wilhelmus Albertus Dries, Amsterdam (NL); Andreas Ekker, Amsterdam (NL); Jan Kater, Amsterdam (NL); Richard Addison Sanborn, Houston, TX (US); Alex Christian Hoffmann, Bergen (NO); Weiming Peng, Bergen (NO)

(73) Assignee: Shell Oil Company, Houston, TX (US)

( * ) Notice: Subject to any disclaimer, the term of this patent is extended or adjusted under 35 U.S.C. 154(b) by 668 days.

(21) Appl. No.: 10/521,509

(22) PCT Filed: Jul. 17, 2003

(86) PCT No.: PCT/US03/22294

§ 371 (c)(1),
(2), (4) Date: Jul. 13, 2005

(87) PCT Pub. No.: WO2004/009244

PCT Pub. Date: Jan. 29, 2004

(65) Prior Publication Data

US 2006/0070362 A1 Apr. 6, 2006

(30) Foreign Application Priority Data

Jul. 19, 2002 (EP) .................................. 02077964

(51) Int. Cl.
*B01D 45/12* (2006.01)
(52) U.S. Cl. .............................. 55/448; 55/396; 55/456
(58) Field of Classification Search .................. 55/456, 55/396, 434, 447, 448, 449, 458; 95/269
See application file for complete search history.

(56) References Cited

U.S. PATENT DOCUMENTS

| 1,753,502 | A |   | 4/1930  | Clark |         |
|-----------|---|---|---------|-------|---------|
| 2,582,423 | A | * | 1/1952  | Foley | 55/398  |
| 2,667,944 | A | * | 2/1954  | Crites | 55/422 |
| 2,936,043 | A | * | 5/1960  | Armstrong et. al. | 55/416 |
| 3,541,766 | A |   | 11/1970 | Wilson | 55/348 |
| 3,590,558 | A | * | 7/1971  | Fernandes | 55/338 |
| 3,675,401 | A | * | 7/1972  | Cordes | 55/394 |

(Continued)

FOREIGN PATENT DOCUMENTS

EP          0052042        5/1982

(Continued)

OTHER PUBLICATIONS

International Search Report dated Dec. 2, 2003.

(Continued)

*Primary Examiner*—Duane Smith
*Assistant Examiner*—Sonji Turner
(74) *Attorney, Agent, or Firm*—William E. Hickman

(57) ABSTRACT

Swirl tube separator for separating solids from a gas-solid containing feed comprising a tubular housing, an inlet for introducing a gas-solids mixture at one end of said housing, a solids outlet opening at the opposite end of said housing, and a co-axial positioned tubular gas outlet conduit placed at an end of said housing, wherein along the axis of the tubular housing a vortex extender pin is present.

14 Claims, 2 Drawing Sheets

U.S. PATENT DOCUMENTS

| | | | | |
|---|---|---|---|---|
| 3,802,570 | A | * 4/1974 | Dehne | 210/304 |
| 3,940,331 | A | 2/1976 | Rastatter | 209/211 |
| 4,072,481 | A | 2/1978 | Laval, Jr. | 55/177 |
| 4,795,561 | A | 1/1989 | Aslin | 210/512.1 |
| 4,810,264 | A | * 3/1989 | Dewitz | 48/210 |
| 4,853,003 | A | * 8/1989 | Dewitz | 95/15 |
| 4,863,500 | A | * 9/1989 | Rombout et al. | 55/348 |
| 5,328,592 | A | 7/1994 | Hedrick | 208/113 |
| 5,372,707 | A | 12/1994 | Buchanan et al. | 208/161 |
| 5,514,271 | A | 5/1996 | Buchanan et al. | 203/113 |
| 5,538,696 | A | 7/1996 | Raterman et al. | 422/147 |
| 5,681,450 | A | 10/1997 | Chitnis et al. | 208/113 |
| 5,690,709 | A | * 11/1997 | Barnes | 55/348 |
| 5,960,709 | A | 10/1999 | Yip | 99/510 |
| 6,174,339 | B1 | 1/2001 | Varady | 55/348 |
| 6,830,734 | B1 | * 12/2004 | Dirkse et al. | 422/144 |

FOREIGN PATENT DOCUMENTS

| | | |
|---|---|---|
| EP | 0360360 | 3/1990 |
| GB | 1411136 | 10/1975 |

OTHER PUBLICATIONS

Hydrocarbon Processing, Jan. 1985, pp. 51-54.

* cited by examiner

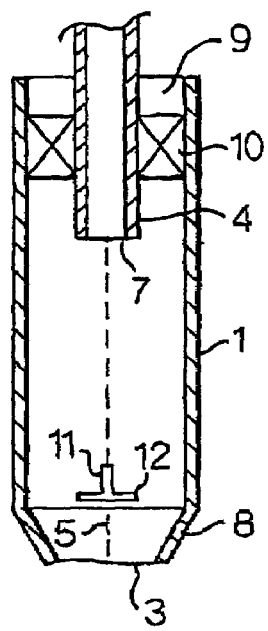
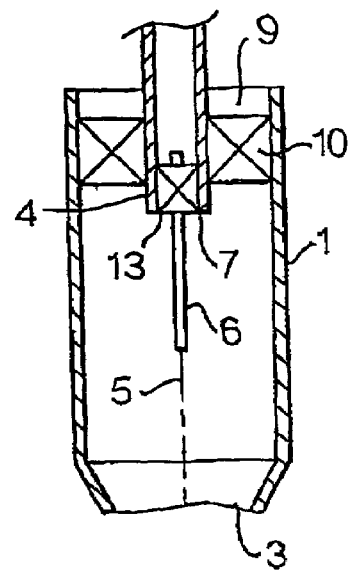
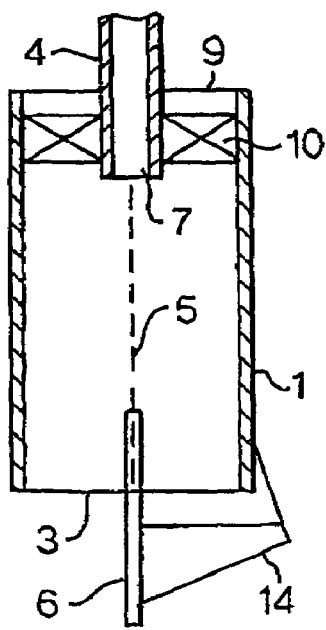
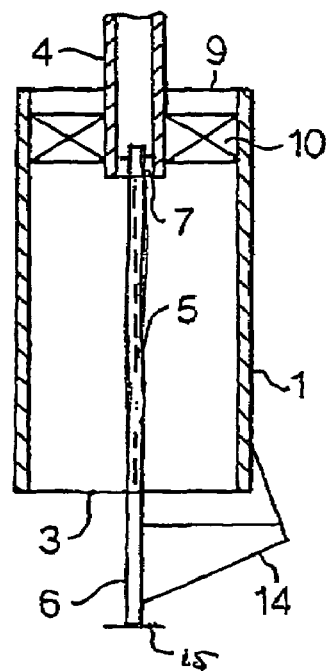

SWIRL TUBE SEPARATOR

The present application claims priority of European Patent Application No. 02077964.1 filed 17 Jul. 2003.

FIELD OF INVENTION

The invention is related to an improved swirl tube separator. The invention is also related to an improved design for a third stage separator comprising the improved swirl tube separators. Such third stage separators may for example be used in a fluid catalyst cracker (FCC) process.

BACKGROUND OF INVENTION

The removal of finely-divided solid particles from entraining gases is necessary in almost any system in which the gas is to be passed through a fluid dynamic device containing gas-deflecting walls, such as an expansion turbine at an expander, to prevent erosion damage to such systems. Additionally, if the entraining gas is ultimately to be discharged to the atmosphere, the removal of particulate matter is also important from an environmental conservation standpoint. Emission levels of below 50 mg/Nm$^3$ are sometimes required because of these environmental restrictions.

Suitable separators for removal of finely divided solid particles from entraining gases are so-called third stage separators as for example described in Hydrocarbon Processing, January 1985, 51-54. Third stage separators remove to an acceptable level the fine particles still present in the gas stream leaving the fluid catalyzed cracker regenerator just up-stream of an expander turbine or flue-gas boiler. It has been found that third stage separators may also find application in other processes, wherein finely divided solid particles are to be separated from entraining gases. Examples of such processes are direct iron reduction processes, coal gasification processes, coal based power plants and calcining processes, such as aluminium calcining.

Third stage separators as for example described above comprise a plurality of parallel-arranged swirl tube separators. Swirl tube separators are cylindrical cyclones with an axial entry for a solids-gas mixture and are for example described in EP-B-360360, U.S. Pat. No. 4,863,500, U.S. Pat. No. 5,681,450, GB-A-1411136 and U.S. Pat. No. 3,541,766. In EP-B-360360 a swirl tube separator unit is described comprising of a gas outlet tube placed axially in the upper part of a vertically tubular housing, wherein an axial directed gas inlet means is provided by the annular space between the gas outlet tube and the vertically arranged tubular housing and wherein in said annular space swirl imparting means are arranged. In FIG. 2 of EP-B-360360 a swirl tube separator is shown having a vortex stabilizer comprising a pin placed on a base element. It is believed that the vortex will be kept in the center of the tubular housing because the lower end of the vortex will terminate on the pin.

It has been found that when such a cyclone separator is used on a feed containing a substantial amount of solids, such as is the case in a third stage separator, non-axial symmetric vortex development can occur. Such a non-preferred operation results in that the cyclone does not separate solids as optimally as required. Furthermore erosion of the inside of the tubular part of the cyclone has been observed.

U.S. Pat. No. 4,810,264 discloses a cyclone separator having a tangentially arranged inlet for gas and solids. Below the gas outlet conduit an adjustable vortex stabiliser in the form of a flat plate or a disc is positioned. On this stabiliser a vortex finder is positioned. According to this publication the distance between vortex stabiliser and the gas outlet opening is frequently adjusted such to vary the particulate content of the gas exiting through the gas-outlet opening.

U.S. Pat. No. 1,753,502 discloses a pneumatic dust collector. The dust collector consists of a cyclone having a tangentially arranged gas-solids inlet opening. From the gas outlet conduit a stem extends to a disk positioned below the gas outlet opening.

EP-A-052042 discloses a swirl tube separator provided with anti-erosion means fixed on the interior wall of the housing of the separators.

U.S. Pat. No. 4,795,561 discloses a cyclone separator provided with a tangential arranged gas-solids inlet, a cylindrical housing with a closed bottom and a valve at the bottom of the cylindrical housing. The valve is fixed to a pin. The opposite end of this pin is located in the gas outlet conduit present at the upper end of the cylindrical housing. The pin thus mechanically positions the valve and the movement of the valve within the separator.

U.S. Pat. No. 4,072,481 discloses a device for separating a gas from a mixture of a liquid, solids and gas. The inlet for the mixture is tangential. A so-called stand provided with a plate at its upper end is present at some distance below the outlet for the gaseous phase.

U.S. Pat. No. 4,795,561 discloses a cyclomic separator for use in fluid flow systems that comprises a housing containing an inlet, a moveable shroud, and at least one variable area outlet.

The object of the present invention is to provide a swirl tube separator having improved separation efficiency and which has a lesser tendency to operate with a non-symmetric vortex.

SUMMARY OF INVENTION

The invention is directed to the following swirl tube separator. Swirl tube separator for separating solids from a gas-solid containing feed comprising tubular housing, an axial inlet for introducing a gas solids mixture at one end of said housing, wherein said axial inlet for introducing the gas-solids mixture is provided with swirl imparting means, a solids outlet opening at the opposite end of said housing, and a co-axial positioned tubular gas outlet conduit placed at an end of said housing, wherein along the axis of the tubular housing a vortex extender pin is present.

The invention is also directed to a multi separator consisting a plurality of the above described swirl tube separators. The invention is also directed to the use of the swirl tube separator and/or the multi separator.

DETAILED DESCRIPTION OF THE INVENTION

Applicants found that the above swirl tube separator shows improved separation efficiency in combination with a more stable operation than swirl tube separators not having the above-described pin. This stable operating condition is also observed and advantageous when a multitude of swirl tube separators operate in parallel, wherein the solids outlet opening of each individual swirl tube separators is in fluid communication with the common solids collecting space of the vessel, such as shown in U.S. Pat. No. 5,538,696 and in the above referred to article.

The actual location of the vortex extender pin along the axis of the tubular housing is not critical as long as the pin runs along a certain length of the axis. Applicants have found that the pin may be located at the solids outlet opening and/or at the gas outlets opening or extend from the gas outlets opening to the solids outlet opening. Thus two separate pins, one extending from the top and one from the bottom and both along the axis of the tubular housing, are to be considered as a possible embodiment of the present invention. It appears that the vortex is extended and operates more stable when using a swirl tube separator according the invention.

From a constructional point of view it is more advantageous to locate the pin at the gas inlet opening of the gas outlet conduit, wherein the pin extends into the tubular housing. The pin may then be suitably fixed with fixing means inside the gas outlet conduit.

It has been found preferred to use a pin having a minimal length such that the vortex is sufficiently guided. The length (l) of the pin along the axis may be as long as possible. Applicants found that longer pin lengths (l) are advantageous for achieving a better separation efficiency. However very long pins will suffer from mechanical failure if they are not supported along their length. These supports in the tubular housing are on the other hand not preferred because they negatively influence the separation efficiency. The maximum length will thus be determined by for example the strength of the pin material, its tendency to vibrate and the nature of the pin supports chosen. For this reason pins extending from within the gas outlet conduit are preferred because fixation can be performed inside the gas outlet conduit only, resulting in a minimal disturbance of the vortex along the pin within the tubular housing. Preferred pins which are fixed in the gas outlet conduit and which run along 100% of the axis may advantageously be also supported at its lower end. More preferably such long pins extend to a position below the tubular housing to allow the lower support to be placed somewhat spaced away from said housing. The length of such pins may be up to twice the length of the axis. Hollow pins may suitably be used because they are more rigid.

The pin is preferably fixed within the gas outlet conduit. Optionally the pin is also fixed in the tubular housing. Fixation is preferably performed by means of a vane-body placed in the gas outlet conduit. This vane body will, in use, convert the swirling motion of the gas being discharged from the tubular housing (2) in the gas outlet conduit into a pressure increase downstream of the vane body. Thus a swirl tube separator provided with such a vane body will have a reduced pressure drop.

Preferably the pin runs along at least 20%, more preferably along at least 30% of the axis. The pin may run up to 100% of the axis. The axis is defined from the inlet opening of the gas outlet conduit to the opposite end of the tubular housing. With tubular housing is here meant the part having a constant diameter, thus excluding any tapered parts. Furthermore the opposite end is either the solids outlet opening in case of a reverse flow swirl tube or the gas-solids inlet opening for a co-current swirl tube. The pin may be longer than the axis itself. The length may be limited at its upper end in order to minimize vibration of the pin. Alternatively the pin will need to be fixed such that vibration is avoided.

The axial inlet of the swirl tube will be provided with swirl imparting means such that in the tubular housing sufficient swirling movement is effected to separate the solids from the gas through centrifugal forces.

The axial inlet may have a tubular design or an annular design depending on, for example, the position of the gas outlet conduit. If the swirl tube separator is of the co-current type the gas outlet conduit is positioned at the opposite end of the tubular housing relative to the gas-solids inlet. The gas solids inlet is then preferably a centrally placed conduit placed co-axial with the housing and provided with swirl imparting means. The above-defined axis will run from the swirl imparting means to the gas inlet opening of the gas outlet conduit.

If the gas outlet conduit is positioned at the same end of the tubular housing as the gas solids inlet, then the gas-solids inlet is preferably positioned in the annular space between the gas outlet conduit and the wall of the housing. Such a swirl tube is also referred to as the reverse flow type. The axial gas solids mixture inlet will be positioned at one end of the tubular housing and the solids outlet will be preferably positioned at the opposite side of the housing. Preferably the solids outlet opening is positioned at the opposite side of the tubular housing relative to the gas outlets conduit. Optionally the tubular housing can extend into a tapered part at this end resulting in a smaller solids outlet opening. More preferably however an open ended tubular housing is used such that solids, which accumulate at the wall of the housing, can be discharged freely from the housing at the solids outlet opening.

If the gas outlet is positioned at the same end as the gas-solids inlet (reverse flow swirl tube) the design of the solids outlet may be simply provided by the open ended tubular housing at the opposite end. The solids outlet of the co-current type separator may be suitably positioned in the space between the centrally positioned gas outlet conduit and the wall of said housing as for example described in U.S. Pat. No. 5,690,709.

The invention is especially directed to a swirl tube separator of the swirl tube design, having an axial gas-solids inlet and a gas outlet conduit both positioned at the same end of the tubular housing. The solids outlet is preferably provided by the open ended tubular housing at the opposite end. The invention is also directed to the case that the gas-outlet and the solids-outlet are positioned at the same end of the tubular housing, hence opposite to the inlet. Preferably no plates or other obstructions are placed in said solids outlet opening.

Most of the dimensions of the swirl tube are conventional, such as sizing of the gas/solids inlet, gas outlet and the tubular housing. Preferred dimensions of the swirl tube separator according to the invention are given below. The inner diameter (d2) of the tubular housing of a swirl tube separator may range from 0.15 to 1.5 m. When the swirl tube separator is used to separate solids having a diameter ranging between $1*10^{-6}$ m and $40*10^{-6}$ m from a gas stream this diameter (d2) is preferably between 0.15-0.3 m. The higher diameter range, up to 1.5 m, may be applied in swirl tubes, which are used in a FCC configuration as described in U.S. Pat. No. 5,328,592.

The distance (d3) between the lower end of the tubular housing and the inlet of the gas outlet conduit, also referred to as the axis, has been found to be an important design parameter to achieve an even more optimal separation efficiency. The ratio d3/d2 is preferably between 1.5 and 5, more preferably between 2 and 5 and even more preferably between 2.5 and 4. A greater distance d3 can result in that the vortex is not stabilised, while a shorter distance can result in lower separation efficiency.

The diameter (d4) of the inlet of the gas outlet conduit is preferably between 0.3*d2 and 0.6*d2.

The swirl tube separator according to the invention may suitably be used for various types of gas-solid separations. Especially when a low emission of solids per volume is required the separator may advantageously be used. The separator according to the invention is advantageously used to separate solids having a diameter ranging between $1*10^{-6}$ m and $40*10^{-6}$ m from a gas stream. The gas stream usually has a solids content of between 100 and 500 mg/Nm$^3$. The cleaned gas leaving the improved separator can have emission levels of below 50 mg/Nm$^3$ and even below 30 mg/Nm$^3$.

The invention is also related to an improved third stage separator comprising a number of the above described cyclonic separators according to the present invention, which cyclonic separator tubes are operating in parallel and are mounted between two tube sheets in a pressure vessel. Examples of state of the art third stage separators that can be modified by adding a pin as described above are described in U.S. Pat. No. 3,541,766, U.S. Pat. No. 5,690,709, U.S. Pat. No. 5,372,707, U.S. Pat. No. 5,514,271, and U.S. Pat. No. 6,174,339. The axial gas inlet of the swirl tubes will be in fluid connection with a gas-solids inlet space between the tube sheets, which is in turn fluidly connected to the gas-solids inlet of the third stage separator. The open bottom ends of the housing of the different swirl tubes are in fluid connection with a solids collecting space in the lower part of the pressure vessel, also called the catch chamber. The catch chamber is further provided with a solids outlet. The gas outlet conduit is in fluid connection with a clean gas collecting space, which is in turn fluidly connected to a clean gas outlet of the third stage separator.

The number of swirl tube separators units present in the third stage separator will depend on the flow rate of the feed. Typically between 1 and 200 swirl tube separation units are present in one pressure vessel.

The tubular housing may be positioned vertical, under an angle or even horizontal. Preferably the solids outlet is positioned at the lower end of the tubular housing if said housing is positioned vertical or under an angle of between 0 and 90°.

BRIEF DESCRIPTION OF THE DRAWINGS

The invention will be illustrated by means of FIGS. 1-6.

FIG. 1 is a state of the art swirl tube separator.

FIG. 2 is a reverse flow swirl tube separator according to the invention having a pin extending from the gas outlet conduit.

FIG. 3 is a reverse flow swirl tube separator according to the invention having a pin extending from the solids outlet opening.

FIG. 4 is a reverse flow swirl tube separator according to the present invention wherein a pin is present along the entire axis.

DETAILED DESCRIPTION OF THE DRAWINGS

Figure 5:
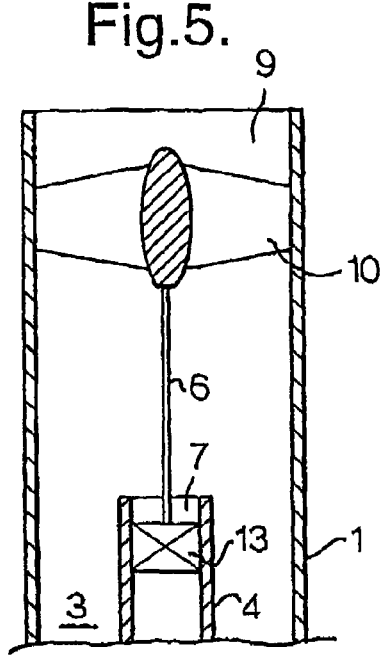
FIG. 5 is a co-current swirl tube separator wherein a pin is present along the entire length of the axis.

FIG. 1 shows a state of the art axial swirl tube consisting of a tubular housing 1, a gas-solids inlet opening 9, swirl imparting means 10 located in the annular space between tubular housing 1 and gas outlet conduit 4. The tubular housing 1 is connected to a frusto conical part 8, which terminates at the solids outlet opening 3. The gas outlet conduit is provided with a gas inlet opening 7. On the axis 5 a vortex stabilizer plate 12 and a vortex stabilizer pin 11 is present.

FIG. 2 shows a reverse flow swirl tube separator as in FIG. 1 wherein along the axis 5, which axis runs from the gas inlet opening 7 to the solids outlet opening 3, a vortex extender pin 6 is present. The pin 6 is fixed inside the gas outlet conduit 4 by means of a swirl body 13. The swirl body 13 is such that in use the swirling motion of the gas flowing in said tube 4 is decreased. Preferably the swirl body extends from the gas outlet tube 4 some distance to a position below the gas inlet opening 7 (not shown). More preferably less than 75% of the length of body 13 extends from the tube 4. The other reference numbers have the same meaning as in FIG. 1.

FIG. 3 shows a reverse flow swirl tube separator as in FIG. 2 except that the vortex extender pin 6 is located at the solids outlet opening 3. Furthermore no frusto conical part 8 is present. The pin 6 is fixed by means of fixation rods 14. Fixation rods 14 are preferably designed not to influence the rotating flow of solids and gasses that may occur at that position. The other reference numbers have the same meaning as in FIG. 1.

FIG. 4 is a reverse flow swirl tube separator as in FIG. 3 wherein along the entire length of the axis a pin 6 is present. The pin is fixed in the gas outlet conduit 4. A small horizontal plate 15 may be present at the lower end of the pin 6. Because pin 6 extends to a considerable distance, preferably at a distance of more than 80% of the axis below the gas inlet opening 7, a long vortex will result. In order to let such an extended vortex end at a predetermined location such a plate may be used. Preferably such a plate 15 is small in order not to disturb the solids being discharged from the tubular housing. The other reference numbers have the same meaning as in FIG. 1.

FIG. 5 is a co-current swirl tube separator, wherein gas-solids inlet 9 is arranged at one end of the tubular housing 1 and the solids 3 and gas outlets conduit 4 are arranged at the other end of the tubular housing 1. At the gas-solids inlet opening 9 swirl imparting means 10 are present. These means 10 may as shown consist of a central body on which vanes are positioned. The solids outlet opening 3 is formed by the annular space between tubular housing 1 and the gas outlet conduit 4. The pin 6 is fixed at both swirl means 10 and via swirl means 13 inside the gas outlet conduit 4. This double fixation is advantageous in order to limit vibrations of the pin. Preferably the swirl body extends from the gas outlet tube 4 some distance to a position above the gas inlet opening 7 (not shown). More preferably less than 75% of the length of body 13 extends from the tube 4.

It is clear the features shown in either one of the FIGS. 1-5 may find use in an illustrated swirl tube not having such a feature. For example the swirl tube of FIG. 4 may also be provided with swirl means 13 of FIG. 2.

Figure 6:
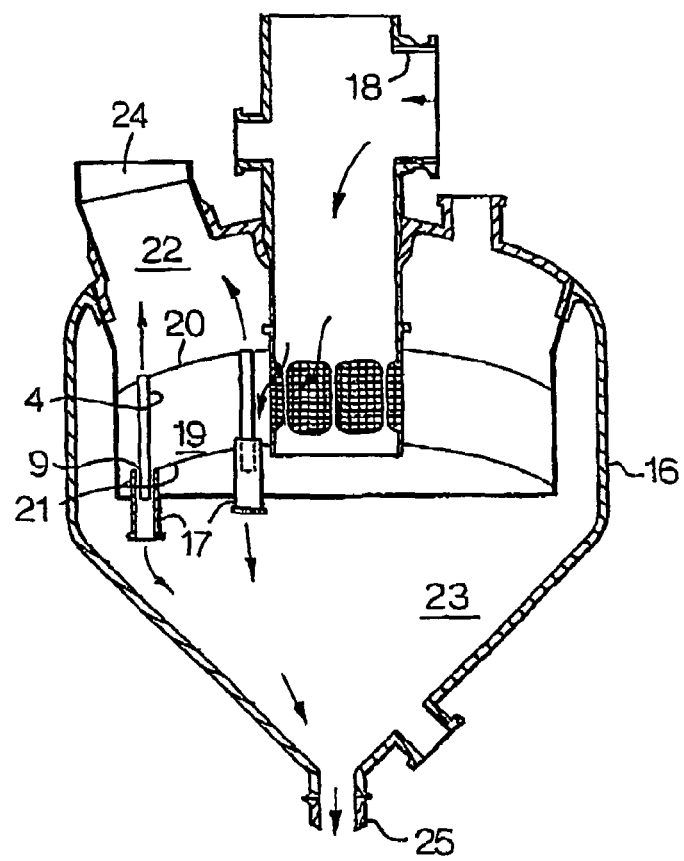
FIG. 6 shows a vessel provided with a number of the swirl tube separators according to the present invention.

FIG. 6 shows a vessel 16 provided with a number of the swirl tube separators 17 according to the present invention. The vessel is provided with a gas-solids inlet conduit 18, which is fluidly connected to a space 19, which is closed from the rest of the vessel by tube sheets 20 and 21. This space 19 is fluidly connected to the individual gas-solids inlet openings 9 of the swirl tube separators 17. The gas outlet conduit 4 is fluidly connected with a gas outlet collecting space 22 and the solids outlet opening is fluidly connected with the solids collecting space 23. The gas outlet collecting space is connected to a gas outlet 24 and the solids collecting space 23 is connected with a solids outlet 25.

We claim:

1. A swirl tube separator for separating solids from a gas-solid containing feed comprising a tubular housing;

an axial inlet for introducing a gas-solids mixture at a first end of said housing, wherein said axial inlet for introducing the gas-solids mixture is provided with swirl imparting means;

a solids outlet opening at a second end of said housing; and a co-axial positioned tubular gas outlet conduit placed at the first end of said housing such that the axial inlet for introducing a gas-solids mixture is positioned in the space between the tubular gas outlet conduit and the wall of the tubular housing, wherein along the axis of the tubular housing a vortex extender pin is present; further wherein the solids outlet opening comprises an annular opening surrounding the vortex extender pin.

2. The swirl tube separator according to claim 1, wherein the pin is present along at least 20% of the axis of the tubular housing, said axis running from the first end to the second end.

3. The swirl tube separator according to claim 2, wherein the pin is from 30% to 100% of the axis of the tubular housing.

4. The swirl tube separator according to claim 3, wherein the pin is present along 100% of the axis of the tubular housing.

5. The swirl tube separator according to claim 4, wherein the pin extends from the interior of the gas outlet conduit into the tubular housing and wherein the pin is fixed within the gas outlet conduit by means of supporting means, said supporting means are swirl means which swirl means are positioned such that they decrease the swirling motion of the gas being discharged via the gas outlet conduit.

6. Multi separator provided with a plurality parallel operating swirl tube separators according to claim 1.

7. A process to separate solids from a solids laden gaseous mixture having a solids content of between 100 and 500 mg/Nm$^3$ to obtain a gaseous stream containing less than 50 mg solids per Nm$^3$ in a swirl tube according to claim 1.

8. The swirl tube separator according to claim 1, wherein the pin extends from the interior of the gas outlet conduit into the tubular housing and wherein the pin is fixed within the gas outlet conduit by means of supporting means, said supporting means are swirl means which swirl means are positioned such that they decrease the swirling motion of the gas being discharged via the gas outlet conduit.

9. The swirl tube separator according to claim 2, wherein the pin extends from the interior of the gas outlet conduit into the tubular housing and wherein the pin is fixed within the gas outlet conduit by means of supporting means, said supporting means are swirl means which swirl means are positioned such that they decrease the swirling motion of the gas being discharged via the gas outlet conduit.

10. The swirl tube separator according to claim 3, wherein the pin extends from the interior of the gas outlet conduit into the tubular housing and wherein the pin is fixed within the gas outlet conduit by means of supporting means, said supporting means are swirl means which swirl means are positioned such that they decrease the swirling motion of the gas being discharged via the gas outlet conduit.

11. The swirl tube separator according to claim 1, wherein the inlet for introducing the gas solids mixture and the gas outlet conduit are arranged at one end of the tubular housing and the solids outlet opening is positioned at the opposite end of said housing.

12. The swirl tube separator according to claim 2, wherein the inlet for introducing the gas solids mixture and the gas outlet conduit are arranged at one end of the tubular housing and the solids outlet opening is positioned at the opposite end of said housing.

13. The swirl tube separator according to claim 3, wherein the inlet for introducing the gas solids mixture and the gas outlet conduit are arranged at one end of the tubular housing and the solids outlet opening is positioned at the opposite end of said housing.

14. The swirl tube separator according to claim 4, wherein the inlet for introducing the gas solids mixture and the gas outlet conduit are arranged at one end of the tubular housing and the solids outlet opening is positioned at the opposite end of said housing.

* * * * *